United States Patent [19]
Campanella

[11] Patent Number: 5,829,985
[45] Date of Patent: Nov. 3, 1998

[54] INTERACTIVE CHILDREN'S GAME

[75] Inventor: John V. Campanella, Manalapan, N.J.

[73] Assignee: I Create International, Inc., Old Bridge, N.J.

[21] Appl. No.: 674,170

[22] Filed: Jul. 1, 1996

[51] Int. Cl.⁶ ................................................. G09B 5/00
[52] U.S. Cl. ..................... 434/317; 434/308; 434/309; 434/162; 434/169
[58] Field of Search .................................. 434/308, 309, 434/317, 322, 314, 408, 162–165, 430, 169

[56] References Cited

U.S. PATENT DOCUMENTS

| | | |
|---|---|---|
| 3,838,211 | 9/1974 | Joannou ................................. 434/308 |
| 4,007,547 | 2/1977 | Butler et al. . |
| 4,019,263 | 4/1977 | Sakuma . |
| 4,031,634 | 6/1977 | Stastny et al. . |
| 4,178,698 | 12/1979 | Cornell .................................. 434/308 |
| 4,208,809 | 6/1980 | Schwartz ................................ 434/430 |
| 4,255,872 | 3/1981 | Williams, Sr. . |
| 4,673,357 | 6/1987 | Ito . |
| 4,681,548 | 7/1987 | Lemelson . |
| 4,777,329 | 10/1988 | Mallicoat ............................... 434/408 |
| 5,025,314 | 6/1991 | Tang et al. ............................. 434/309 |
| 5,226,822 | 7/1993 | Morris . |
| 5,284,445 | 2/1994 | Dietterich et al. ..................... 434/408 |
| 5,356,296 | 10/1994 | Pierce et al. . |
| 5,413,355 | 5/1995 | Gonzalez . |
| 5,413,486 | 5/1995 | Burrows et al. . |
| 5,433,610 | 7/1995 | Godfrey et al. . |
| 5,437,552 | 8/1995 | Baer et al. . |
| 5,466,158 | 11/1995 | Smith, III . |
| 5,474,457 | 12/1995 | Bromley . |
| 5,501,601 | 3/1996 | Todokoro et al. ..................... 434/169 |
| 5,541,680 | 7/1996 | Fromm .................................. 434/314 |

FOREIGN PATENT DOCUMENTS

| | | |
|---|---|---|
| 5341706 | 12/1993 | Japan . |
| 2227872 | 8/1989 | United Kingdom . |

*Primary Examiner*—Richard J. Apley
*Assistant Examiner*—Glenn E. Richman
*Attorney, Agent, or Firm*—Howard C. Miskin

[57] ABSTRACT

An electronic storybook is disclosed that allows a child to not only interact with the storybook by drawing characters that depict or change a scene, but also to allow the child to record his/her verbal comments, interpretations and impressions while the scene is being created so that the full story told by a child may be captured in an audio-visual manner.

11 Claims, 8 Drawing Sheets

INTERACTIVE CHILDREN'S GAME

BACKGROUND OF THE INVENTION

1.0. Field of the Invention

The invention relates to an electronic storybook for children. More particularly, the invention relates to an electronic storybook that allows a child to not only interact with the storybook by drawing characters that render or change a scene, but also allows for the recording of the child's commentary of the rendered scene contemporaneously with the rendering of the scene.

2.0. Description of Related Art

A child's attention is commonly captured and focused by the use of a storybook that illustrates an account of incidents or events. The child's attention may be captured by the use of pushbuttons that once pushed creates intriguing sounds, such as the sound of a lion. The child's interest may be maintained by additional intriguing sounds while calling the child's attention to a series of scenes contained in the storybook. Storybooks that create intriguing sounds using pushbutton and sound synthesizers are known and one such storybook is disclosed in U.S. Pat. No. 5,356,296 which is herein incorporated by reference. Similarly, storybooks having sound creating features and sound storage-and-playback capabilities are known and one such storybook is disclosed in U.S. Pat. No. 5,437,552 which is also herein incorporated by reference.

A child's attention is also held when he/she is involved in the act of drawing lines on a surface so as to render a scene. Dependent upon the child's age and artistic talents, the rendered scene, although having distinct meaning to the child, may only be comprehensible by that child. The child while justifiably proud of his/her achievement may desire to express his/her delight to others but may not be able to do so due to his/her vocabulary limitation. It is desired that means be provided to allow the child to convey his/her commentary of the rendered scene, especially when the rendered scene may depict a series of events leading up to a conclusion of an envisioned story arranged in a storybook.

A child's verbal and artistic expressions may be enhanced by the assistance of preprogrammed sounds, such as that of a lion sound. Once the child learns to manipulate and integrate such sounds to express a thought, the child may easily utilizes such sounds to improve his/her communication skills. It is desired that preprogram sounds be made available to allow for the child's story telling to be enhanced, especially when the story telling is associated with a storybook comprised of one or more scenes that are rendered by the child.

A child's behavior is known to become somewhat frustrated when he/she misplaces toys. This may become especially frustrating if the child is looking for his/her coloring supplies when involved in playing with a coloring book or some of the instruments that allow the child to render a scene. It is desired that means be provided to allow the goods and supplies related to the storybook to be easily made available to the child.

A child is also known to have a favorite playing area and carries all of his/her toys to that area. It is desirable that a storybook be provided that has portable capabilities so that it may be easily transported by a child.

OBJECTS OF THE INVENTION

It is a primary object of the present invention to provide for a storybook that allows a child to render scenes and has sound recording capabilities that allows the child to convey his/her commentary of the scene contemporaneously with the rendering of the scene.

It is another object of the present invention to provide a storybook in which the child's conveyance of his/her story telling can be enhanced with preprogrammed sounds.

It is a further object of the present invention to provide a child's storybook having means so as to be made portable.

It is a further object of the present invention to provide a child's storybook having storage capabilities so that the child is provided with space to house his/her drawing goods and supplies used for the child's rendering of a scene of the storybook.

It is a further object of the present invention to provide a storybook in which the rendering may be made on paper that is insertable and retractable from the storybook, while at the same time also providing an insertable and retractable sound recording medium, so that the child's commentary of his/her rendering may be removed from the storybook and transported along with the rendering to another party for their enjoyment.

Further still, it is an object of the present invention to provide for a storybook in which the child may be able to render a scene on either a piece of paper or on a piece of plastic material that accommodates, without being pervious to, a water base ink drawing instrument.

SUMMARY OF THE INVENTION

The invention is directed to an electronic storybook that provides an interactive dialogue so that a child may express both of his/her artistic and verbal communication skills while rendering a drawing.

The storybook comprises a surface on which lines are physically drawn to render one or more scenes, a plurality of pushbuttons, a microphone that produces electrical signals in response to a human's voice, a speaker and voice recording circuitry having input and output stages. The plurality of pushbuttons are arranged into groups that are segmented into record and play pushbuttons for each scene. The voice recording circuitry has means for playing back a recorded voice. The voice recording circuitry also has, at its input stage, means for receiving the electrical signals from the microphone and means, at its output stage, for transmitting the recorded voice to the speaker. The voice recording circuitry has means so as to be activated in response to any of the record pushbuttons, or to any of the play pushbuttons.

DETAILED DESCRIPTION OF THE PREFERRED EMBODIMENTS

Figure 1:
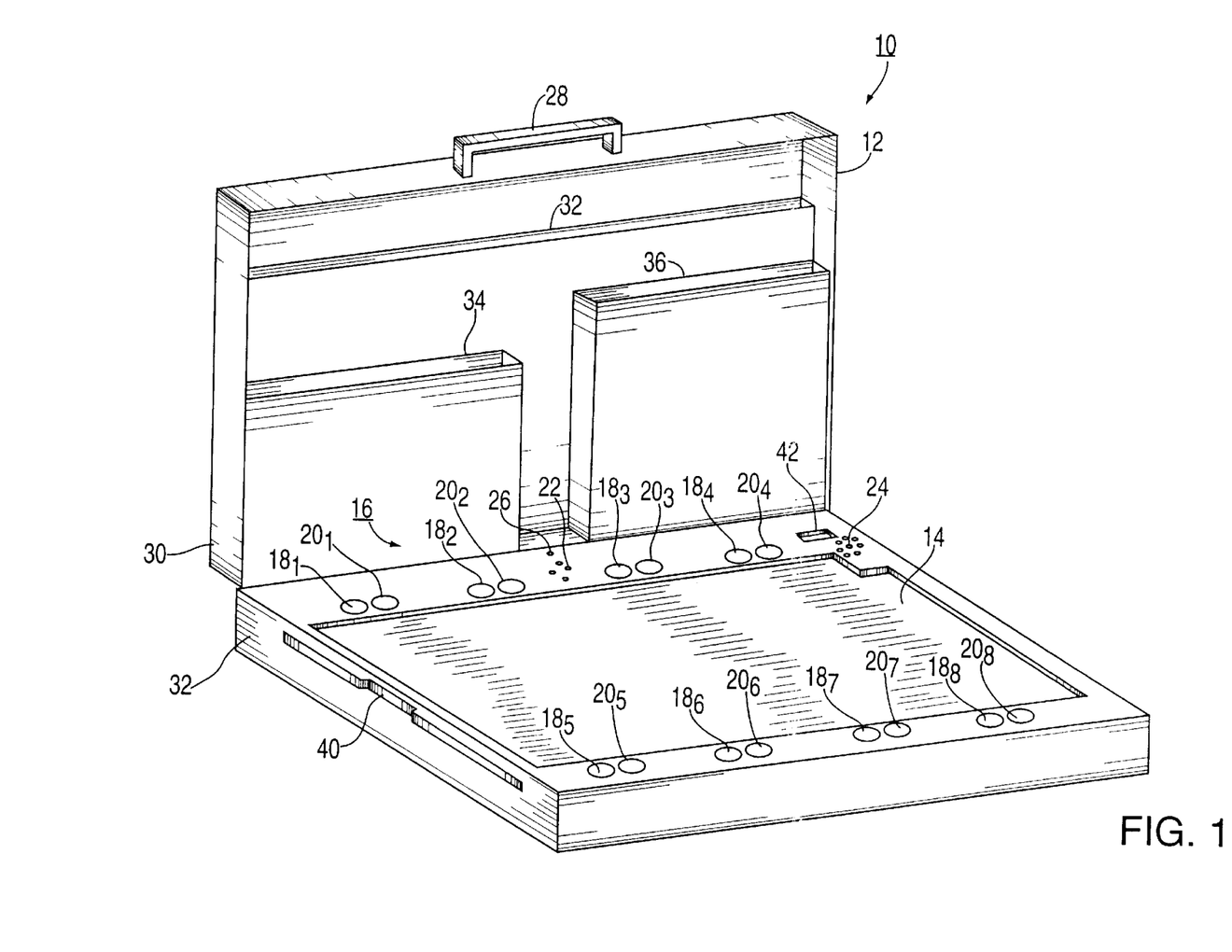
FIG. 1 is a perspective view of the electronic storybook of the present invention.

With reference to the drawings, wherein the same reference numbers are used to designate the same elements throughout, there is shown in FIG. 1 a perspective view of the electronic storybook 10 of the present invention. The electronic storybook 10 is portable and serves as a game or toy that allows a child to tell a story with sketches as well as with audio commentary. More particularly, the electronic storybook 10 allows the child's interactive participation with his/her artistic and verbal communication skills to verbally tell a story while rendering a scene that goes along with the story.

The electronic storybook 10 comprises a case 12, a surface 14 on which lines are physically drawn by a child to sketch or render one or more scenes, a plurality of pushbuttons 16 arranged into groups that are further segmented into record and play pushbuttons designated for each scene. The record pushbuttons are indicated with reference numbers $18_1, 18_2, \ldots 18_8$, whereas the play pushbuttons are indicated with reference numbers $20_1, 20_2, \ldots 20_8$. The electronic storybook 10 further comprises a microphone 22, a speaker 24, and an LED display 26.

The case 12 is preferably comprised of a plastic material so that it is relatively light in weight and easily transported by a child gripping a handle 28 rigidly attached, by appropriate means, to the case 12. The case 12 is shown in FIG. 1 in its open condition and is comprised of an upper portion 30 and a lower portion 32 hingedly connected to each other by appropriate means. The upper portion 30 preferably further comprises, for example, three enclosures 32, 34 and 36 each having an open top portion, as shown in FIG. 1, and each dimensioned to provide space or storage of goods and supplies, such as crayons or other drawing instruments used by a child as he/she enjoys the storybook 10. The bottom portion 32 has a first opening 40 and a second opening 42. The first opening 40 allows for the insertion of a sheet dimensioned in a complementary manner relative to opening 40 and serving as a writing surface, whereas the second opening 42 allows for the insertion of a cartridge dimensioned in a complementary manner relative to the opening 42 and serving as a medium for recording the voice of a child. One of the sheets serving as a surface for sketching or rendering a drawing thereon may be further described with reference to FIG. 2.

Figure 2:
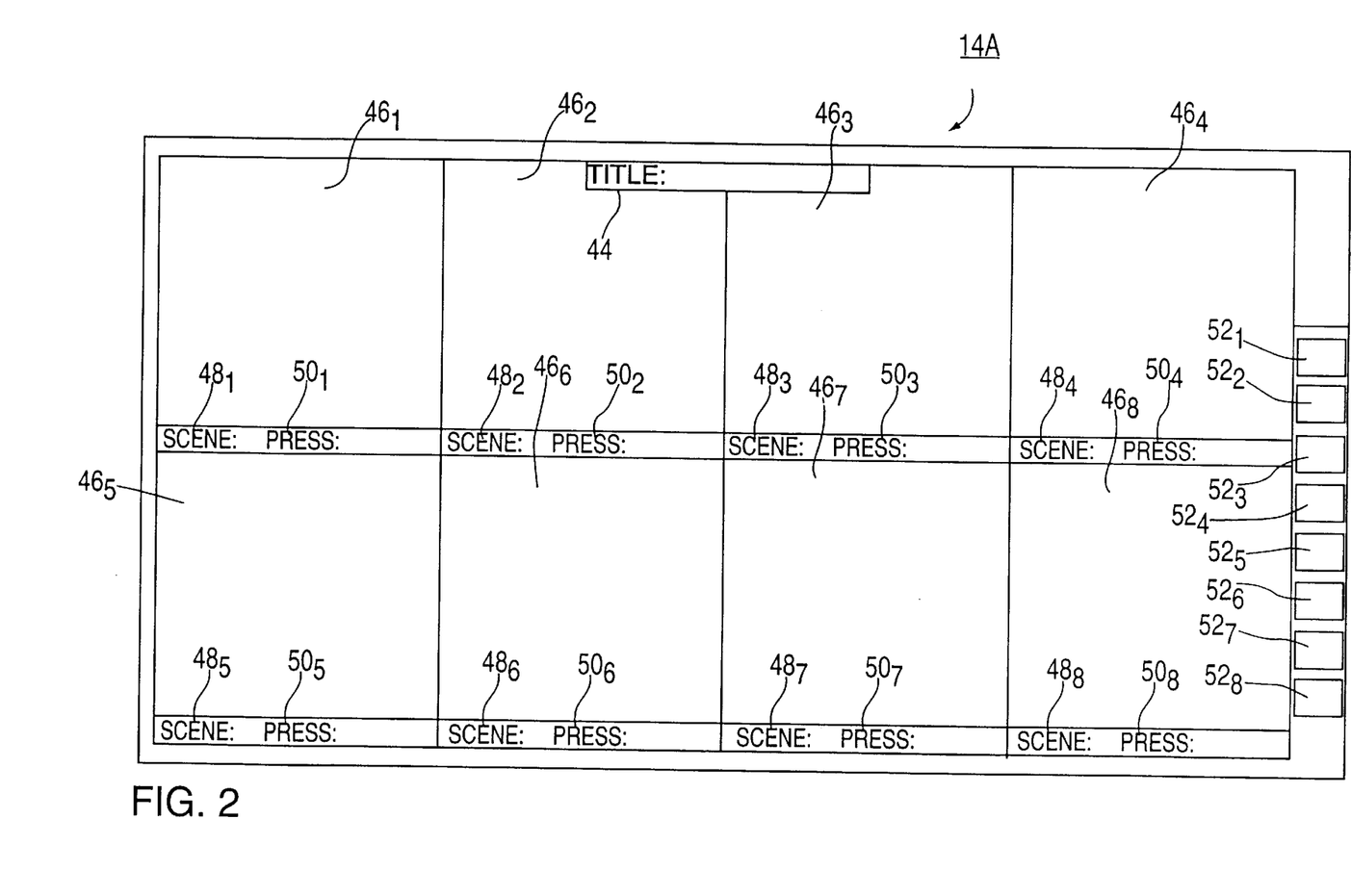
FIG. 2 illustrates one embodiment related to the present invention of disposable paper on which one or more scenes are rendered by a child.

FIG. 2 illustrates a sheet 14A preferably comprised of disposable paper and having a title box 44 that may be used to place nomenclature to identify the one or more scenes to be drawn on the sheet 14A. The sheet 14A may be segmented into eight (8) areas $46_1, 46_2, \ldots 46_8$, each serving as a region for a child to render a drawing or scene with the use of a drawing instrument, such as a crayon. The scenes $46_1, 46_2, \ldots 46_8$ may each have accompanying nomenclature identified as SCENE AND PRESS and respectively indicated in FIG. 2 as $48_1, 48_2, \ldots 48_8$ and $50_1, 50_2, \ldots 50_8$. Further, the scenes $46_1, 46_2, \ldots 46_8$ may be accompanied by pictorial representations $52_1, 52_2, \ldots 52_8$, but shown in FIG. 2 as being blank representations for the sake of simplification.

The pictorial representations $52_1, 52_2, \ldots 52_8$ may be preprinted so as to cumulatively make up a scene. For example, a sheet 14A may be preprinted so that the representations $52_1, 52_2, \ldots 52_8$ comprise "Snow White and the Seven Dwarfs," with, for example, representation $52_1$ being indicative of Snow White and representation $52_2 \ldots 52_8$ respectively representative of the seven (7) individual dwarfs. The pictorial representations $52_1, 52_2 \ldots 52_8$ are positioned over and operate with membrane switches to be described hereinafter with reference to FIG. 4. A further embodiment of a drawing surface for the child's usage may be further described with reference to FIG. 3 illustrating a plastic sheet 54.

Figure 3:
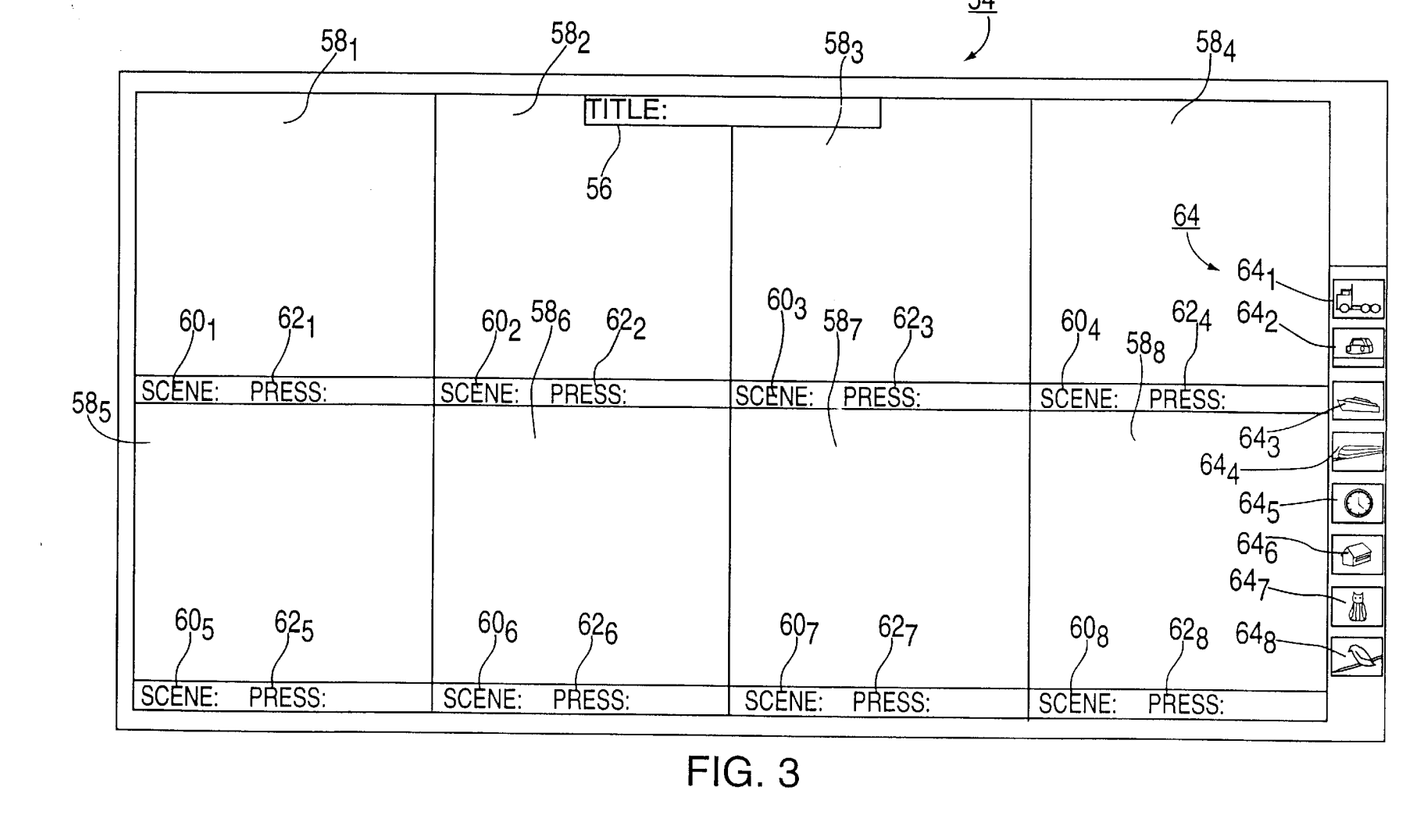
FIG. 3 is another embodiment that provides a plastic surface to allow the child to render one or more scenes with the assistance of pictorial representations each providing a related familiar sound when depressed by the child.

The plastic sheet 54 of FIG. 3 serves as a drawing surface that is preferably impervious to the child's drawing instrument comprising a water based ink so that the child may, if desired, render a scene and then easily wipe away the scene, thereby, making the plastic sheet 54 ready for the child's next rendering. The plastic sheet 54 is similar to the paper sheet 14A and has a title block 56, provides eight (8) individual scene areas $58_1, 58_2, \ldots 58_8$ which, in turn, have accompanying SCENE and PRESS nomenclature respectively indicated as $60_1, 60_2 \ldots 60_8$ and $62_1, 62_2, \ldots 62_8$.

Unlike the paper sheet 14A of FIG. 2, the plastic sheet 54 of FIG. 3 preferably has a plurality of buttons $64_1, 64_2, \ldots 64_8$ each of which, when depressed, cause a preprogrammed sound, corresponding to the item illustrated thereon, to be generated. For example, button $64_1$ illustrates a truck and which, when depressed, provides for a preprogrammed sound, such as a horn, related to a truck. Thus, by pressing the button $64_1$, a horn will blow corresponding to the horn of a truck. The buttons $64_1 \ldots 64_8$ may be formed into the plastic sheet 54 in a manner similar to that disclosed in the previously incorporated by reference U.S. Pat. No. 5,356,296 ('296). The sound synthesizers that cooperate with the depressible buttons $64_1 \ldots 64_8$ may be of the type disclosed in the '296 patent, and are also to be further described hereinafter with reference to FIG. 5. The interrelationship between the plastic sheet 54 of FIG. 3 (or the paper sheet 14A of FIG. 2) and the controls and displays of the electronic storybook 10 may be further described with reference to FIG. 4.

Figure 4:
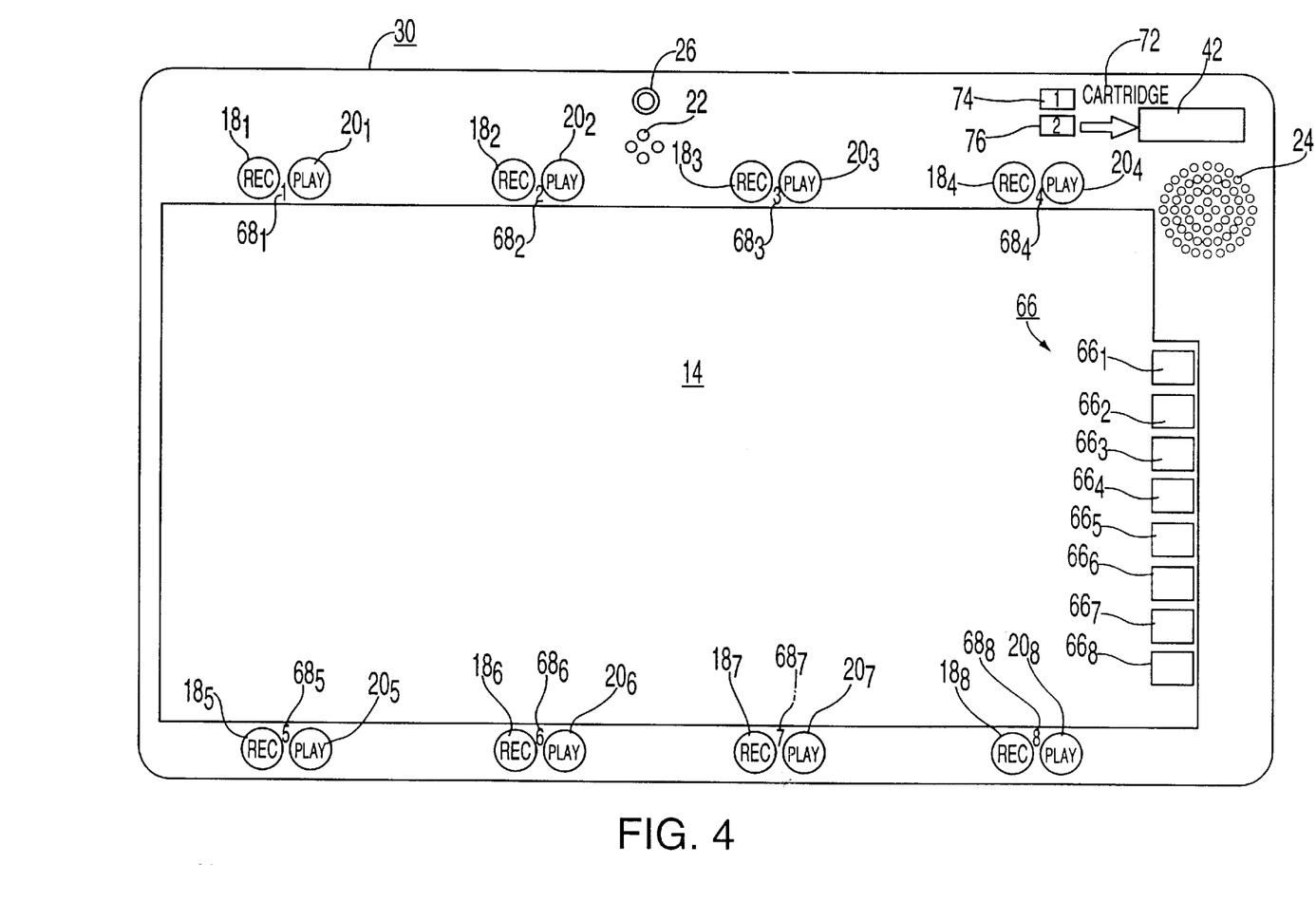
FIG. 4 illustrates further details of the bottom portion of the electronic storybook of FIG. 1.

FIG. 4 illustrates a preferred layout of the bottom portion 30 of the case 12 previously described with reference to FIG. 1. FIG. 4 further illustrates a plurality of membrane switches 66 comprising $66_1, 66_2, \ldots 66_8$ that are respectively related to scenes 1, 2, ... 8 identified in FIG. 4 by reference numbers $68_1, 68_2, 68_8$. As will be further described, the membrane switches $66_1, 66_2, \ldots 66_8$ cooperate with the pictorial representations $52_1, 52_2, 52_8$ of FIG. 2, or the buttons $64_1, 64_2, \ldots 64_8$ of FIG. 3.

Figures 5, 5A:
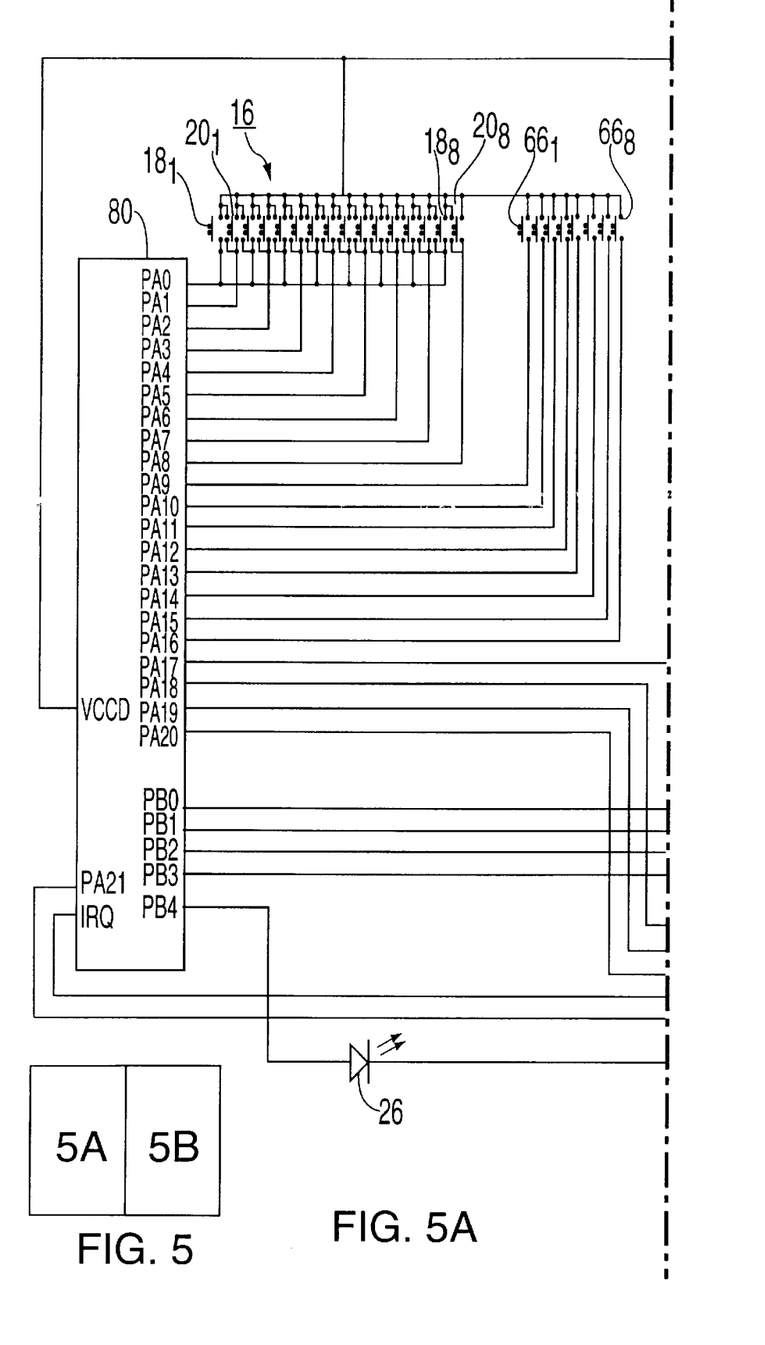
FIGS. 5A & 5B is a schematic of the electronic equipment of the storybook of FIG. 1.
Figure 5B:
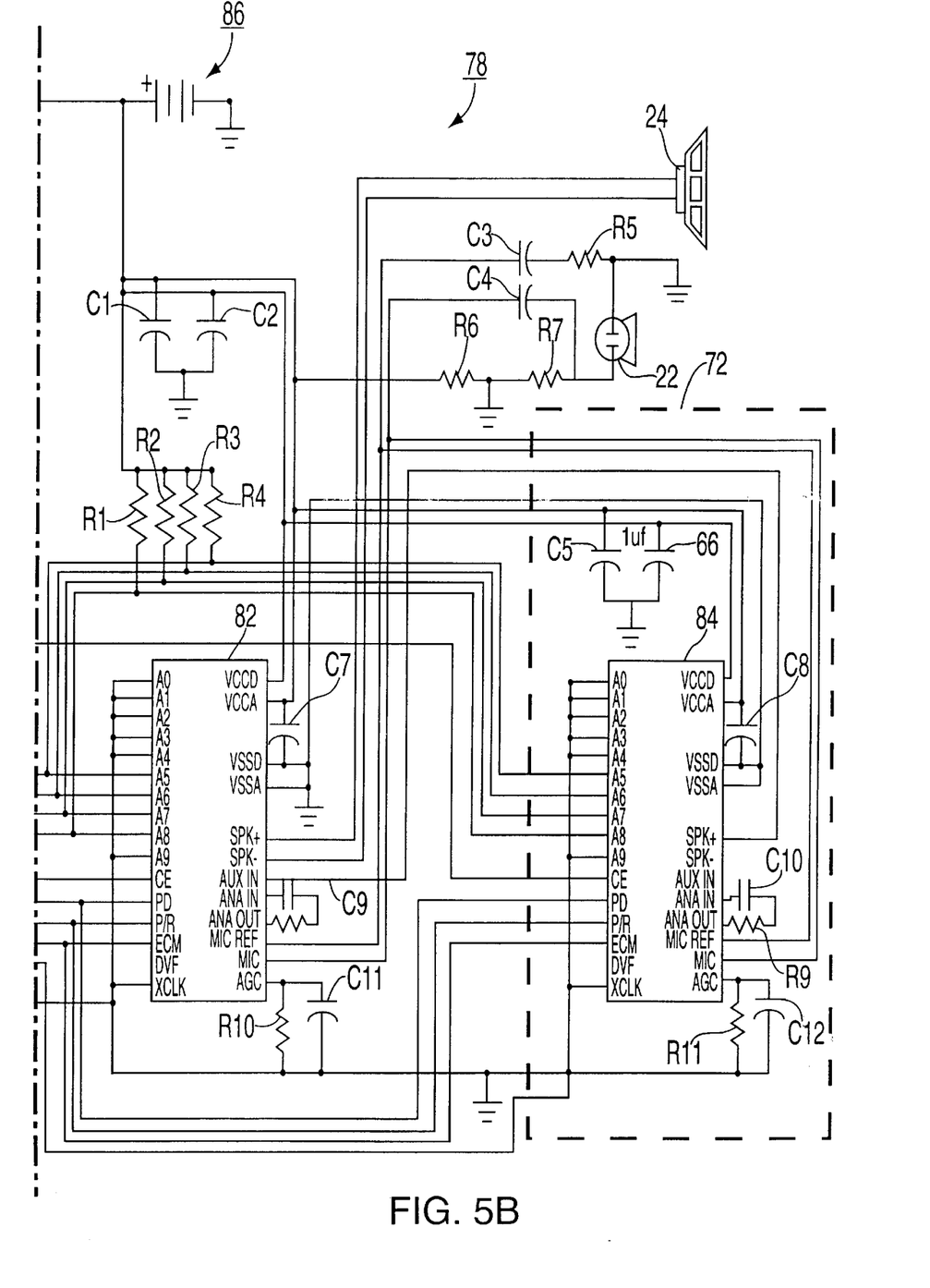

FIG. 4 still further illustrates the surface (devoid of the paper sheet 14A or the plastic sheet 54) also shown in FIG. 1 and which provides the backing for either the paper sheet 14A of FIG. 2 or the plastic sheet 54 of FIG. 3. FIG. 4 further illustrates nomenclature 72 identified as "CARTRIDGE" which, in turn, is identified as being 1 or 2 respectively indicated by the reference numbers 74 and 76 and of which cartridge (not shown in FIG. 4 but to be described with reference to FIG. 5) is insertable into the opening 42. The electronic equipment comprising the electronic storybook 10 may be further described with reference to FIG. 5 showing a circuit arrangement 78 comprising of a plurality of elements, some of which have been previously described, but most of which are illustrated in Table 1 by a corresponding reference number or a component designation.

TABLE 1

| REFERENCE NUMBER/COMPONENT | ELEMENT/COMPONENT VALUE |
|---|---|
| 80 | MICROCONTROLLER |
| 82 | AUDIO STORAGE DEVICE #1 |
| 84 | AUDIO STORAGE DEVICE #2 |
| 86 | BATTERY |
| C1 | 0.1 MICROFARADS |
| C2 | 0.1 MICROFARADS |
| C3 | 0.1 MICROFARADS |
| C4 | 0.1 MICROFARADS |
| C5 | 0.1 MICROFARADS |
| C6 | 0.1 MICROFARADS |
| C7 | 22 MICROFARADS |
| C8 | 22 MICROFARADS |
| C9 | 0.1 MICROFARADS |
| C10 | 0.1 MICROFARADS |
| C11 | 4.7 MICROFARADS |
| C12 | 4.7 MICROFARADS |
| R1 | 47k OHMS |
| R2 | 47k OHMS |
| R3 | 47k OHMS |
| R4 | 47k OHMS |
| R5 | 11k OHMS |
| R6 | 1k OHM |
| R7 | 10k OHMS |
| R8 | 5.1k OHMS |
| R9 | 5.1k OHMS |
| R10 | 470k OHMS |
| R11 | 470k OHMS |

The microcontroller 80 may be of the type COPS made available from National Semiconductor of California. The audio storage devices 82 and 84 may be of the type ISD 2575 made available from Information Storage Devices of San Jose, Calif. As seen in FIG. 5, the audio storage device 84 and the interconnected components all within the phantom lines thereon are identified as being a cartridge 72 and which cartridge 72 is insertable into and retractable from the opening 42, previously described with reference to FIGS. 1 and 4.

The circuit arrangement 78 of FIG. 5 comprises a voice recording circuitry having means for playing back a recorded voice. The recording circuitry 78 has means at its input stage for receiving electrical signals representative of audio information generated by the microphone 22, and has means at its output stage for transmitting electrical signals representative of a recorded voice to the speaker 24. More particularly, as seen in FIG. 5, the microphone 22, having its associated resistors R5, R6 and R7 and capacitors C3 and C4 all arranged as shown, is connected across both the MICROPHONE inputs (REF and MIC) of each of the audio storage devices 82 and 84. Further, the terminals SPK+ and SPK− of the first audio storage device 82 are connected to the speaker 24. It should be noted that the second audio storage device 84 preferably is devoid of any connection to the speaker 24.

The recording circuitry 78 is activated in response to any of the record pushbuttons $18_1 \ldots 18_2$ and its playback capabilities is activated in response to any of the play pushbuttons $20_1 \ldots 20_8$. Further, the voice recording circuitry 78 provides preprogrammed sounds in response to any of the membrane switches $66_1 \ldots 66_8$ being depressed The microcontroller 80 is the device that controls the operation of the voice recording circuitry 78 and is connected to the plurality of pushbuttons $18_1 \ldots 18_8$; $20_1 \ldots 20_8$; and $64_1 \ldots 64_8$. The microcontroller 80 in response to any of the pushbuttons $18_1 \ldots 64_8$ generates a predetermined control routine that is applied to and responded to by the first audio storage device 82 which generates corresponding electrical signals, representative of a recorded voice, which are applied to the speaker 24 for conversion into corresponding sound waves. Similarly, the second audio storage device 84 is connected in parallel with the first audio storage device 82, except that the second audio storage device 84 is not connected to the speaker 24, and accordingly responds to each of the predetermined control routines generated by the microcontroller 80 in a manner similar to that of the first audio storage device 82. As will be further described hereinafter, the second audio storage device 84 is connected to override the first storage device 82. There is no direct connection of the second audio storage device 84 to the speaker 24, but communication is established between the second audio storage device 84 and the speaker by way of the SPK+ output of the second audio storage device 84 and the AUX IN of the first storage device 82 which has a direct connection to speaker 24 as shown in FIG. 5.

The microcontroller 80 has an associated input interface given in Table 2 and identified by the associated pins thereof, and has an associated output interface given in Table 3 and identified by an associated pin thereof.

TABLE 2

| MICROCONTROLLER 80 PIN | ASSOCIATED INPUT INTERFACE PUSHBUTTONS |
|---|---|
| PA0 | $18_1$–$18_8$ PUSHBUTTONS |
| PA1–PA8 | $20_1$–$20_8$ PUSHBUTTONS |
| PA9–PA16 | $66_1$–$66_8$ PUSHBUTTONS |
| VCCD | BATTERY 84 |

TABLE 3

| MICROCONTROLLER 80 PIN | ASSOCIATED OUTPUT INTERFACE |
|---|---|
| PA17 | CHIP ENABLE (CE) INPUT OF AUDIO STORAGE DEVICE 82 |
| PA18 | CHIP ENABLE (CE) INPUT OF AUDIO STORAGE DEVICE 80 |
| PA19 AND PA20 | POWER DOWN INPUTS OF BOTH AUDIO STORAGE DEVICES 82 AND 84 |
| PA21 (CARTRIDGE ENABLE) | GROUND INPUTS OF AUDIO STORAGE DEVICE 84 |
| IRQ (INTERRUPT REQUEST) | END OF MESSAGE INPUTS OF BOTH AUDIO STORAGE DEVICES 82 AND 84 |
| PB0, PB1, PB2 AND PB3 | ADDRESS ENABLE INPUTS OF BOTH AUDIO STORAGE DEVICES 82 AND 84 |
| PB4 | LED ENABLE |

Figure 6:
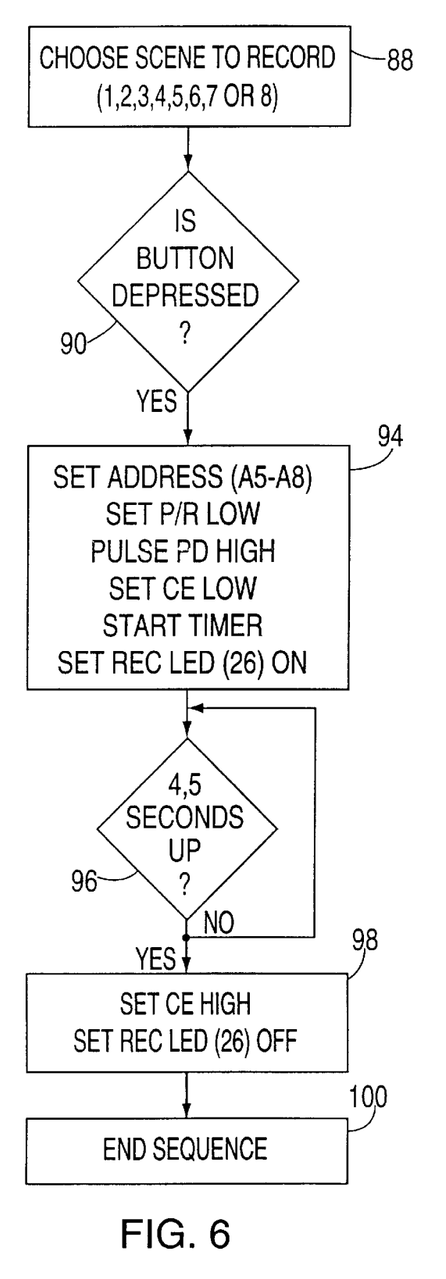
FIG. 6 is a flow chart illustrating the steps taken by the microprocessor of FIG. 5 to control the scenario for recording the scene being rendered by the child.
Figure 7:
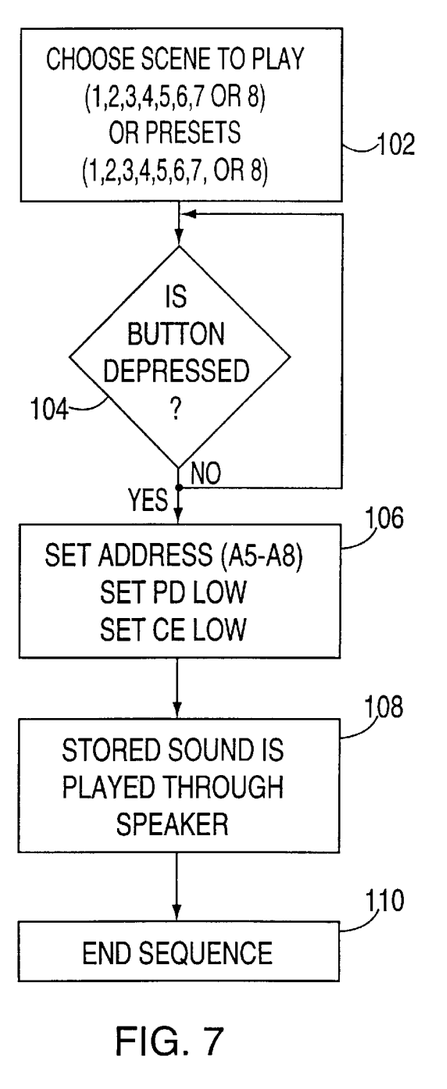
FIG. 7 is a flow chart illustrating the steps taken by the microprocessor of FIG. 5 to control the scenario for playing back the child's commentary created contemporaneously with the scene rendered by the child.
Figure 8:
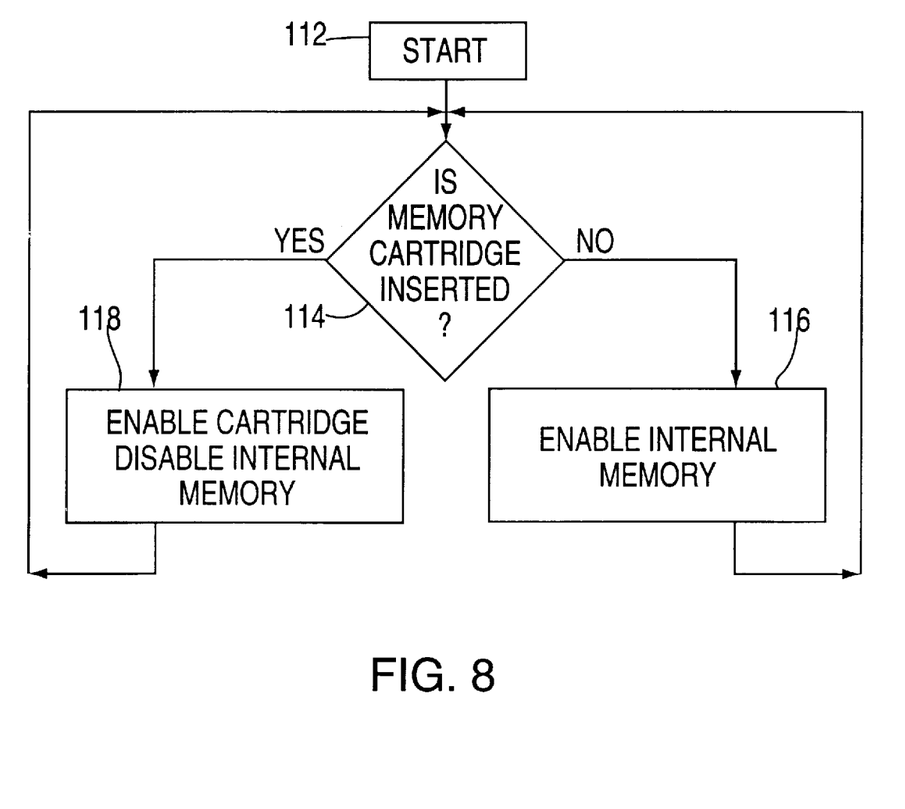
FIG. 8 is a flow chart illustrating the steps taken by the microprocessor of FIG. 5 during a recording scenario by the child to differentiate between the servicing of an inserted cartridge or internal memory.

The microprocessor 80 of FIG. 5 controls the overall operation of the circuit arrangement 78 and its step-by-step sequences are illustrated in the flow charts of FIGS. 6, 7 and 8, each comprised of a plurality of program segments identified by the reference numbers and nomenclature respectively given in Tables 4, 5 and 6.

TABLE 4

| REFERENCE NUMBER | NOMENCLATURE |
|---|---|
| 88 | CHOOSE SCENE TO RECORD (1, 2, 3, 4, 5, 6, 7 OR 8) |
| 90 | IS BUTTON DEPRESSED |

TABLE 4-continued

| REFERENCE NUMBER | NOMENCLATURE |
| --- | --- |
| 94 | SET ADDRESS (A5–A8) |
|  | SET P/R LOW |
|  | PULSE PD HIGH |
|  | SET CE LOW |
|  | START TIMER |
|  | SET REC LED (26) ON |
| 96 | 4, 5 SECONDS UP |
| 98 | SET CE HIGH |
|  | SET REC LED (26) OFF |
| 100 | END SEQUENCE |

TABLE 5

| REFERENCE NUMBER | NOMENCLATURE |
| --- | --- |
| 102 | CHOOSE SCENE TO PLAY (1, 2, 3, 4, 5, 6, 7 OR 8) |
|  | OR |
|  | PRESETS (1, 2, 3, 4, 5, 6, 7 OR 8) |
| 104 | IS BUTTON DEPRESSED |
| 106 | SET ADDRESS (A5–A8) |
|  | SET PD LOW |
|  | SET CE LOW |
| 108 | STORED SOUND IS PLAYED THROUGH SPEAKER |
| 110 | END SEQUENCE |

TABLE 6

| REFERENCE NUMBER | NOMENCLATURE |
| --- | --- |
| 112 | START |
| 114 | IS MEMORY CARTRIDGE INSERTED |
| 116 | ENABLE INTERNAL MEMORY |
| 118 | ENABLE CARTRIDGE |
|  | DISABLE INTERNAL MEMORY |

FIG. 6 illustrates the steps taken by the microprocessor 80 of FIG. 5 to control the scenarios for recording the scene being rendered by a child. With reference to FIG. 6, and also to FIGS. 4 and 5, the program segment 88 allows for a child to choose for his/her recording of his/her commentary contemporaneously with his/her rendering of scene 1, 2 . . . or 8 by the selection of pushbutton $18_1$, $18_2$ . . . $18_8$ (see FIG. 4 and also FIG. 5, in particular PA0 . . . PA8 of microprocessor 80). The microprocessor 80 then passes control over to program segment 90.

Program segment 90 polls the pins PA0 . . . PA8 microprocessor 80 to determine when and if any of the record pushbuttons ($18_1$, $18_2$ . . . $18_8$) for scenes 1, 2 . . . or 8 is depressed. Upon detection of a depressed pushbutton $18_1$, $18_2$ . . . $18_8$, the microprocessor 80 passes control over to program segment 94.

Program segment 94 sets the address correlating to the record pushbutton $18_1$ . . . $18_8$, and applies such a selection, via output terminals PB0, PB1, PB2, PB3 of microprocessor 80, to audio storage device 82 or 84, in particularly inputs A5, A6, A7 and A8 thereof.

Program segment 94, via output terminal PA20 of the microprocessor 80, sets the input P/R of both the audio boards 82 and 84 to a low condition, and also, via output terminal PA19 of microprocessor 80 pulses the PB input of both the audio boards 82 and 84 to its high condition. The program segment 94 via output terminal PA17 and PA18 of microprocessor 80 further sets the CE input of audio storage device 84 or 82, respectively, to a low condition. The program segment 94 then start a timer, having a typical time of 4.5 seconds, within the microprocessor 80 to be described with reference to program segment 96, and also sets the LED 26 to its on condition, by way of the output PB4 of the microprocessor 80.

Program segment 96 counts down the predetermined time of 4.5 seconds, and upon the expiration thereof passes control to program segment 98.

Program segment 98 sets the CE input of both the audio storage devices 82 and 84 to its high condition via the output terminals PA18 and PA17, respectively, of microprocessor 80 and also removes the signal from the output terminal PB4 of microprocessor 80 so as to extinguish the LED 26. Upon such extinguishing, the microprocessor passes control to program segment 100, which is the end of the sequence illustrated in FIG. 6. The playback sequence that either a child or an adult may initiate may be described with reference to FIG. 7.

FIG. 7 is a flow chart illustrating the steps, taken by the microprocessor 80 of FIG. 5, that control the scenario for playing back the child's commentary created contemporaneously with the scene rendered by the child. With reference to FIG. 7, and also FIGS. 4 and 5, program segment 102 allows the child to chose between playing back the commentary previously created by the child's usage of the record pushbuttons $18_1$, $18_2$ . . . $18_8$ in combination with the non-preset (non pre-recorded sounds) pushbuttons $20_1$ . . . $20_8$ and the preset (pre-recorded sounds) pushbuttons $52_1$ . . . $52_8$ (see FIG. 2) or $64_1$ . . . $64_8$ (see FIG. 3) functioning with the membrane switches $66_1$, $66_2$ . . . $66_8$ (see FIG. 4), or the commentary previously created by the child's usage of the record pushbuttons $18_1$, $18_2$ . . . $18_8$ in combination with the preset (pre-recorded sounds, such as a train whistle) pushbuttons $64_1$, $64_2$ . . . $64_8$ (see FIG. 3) functioning with the membrane switches $66_1$, $66_2$ . . . $66_8$. To distinguish whether the non-preset or preset sounds are to be played back, a child needs only to select $20_1$ . . . $20_8$, or $64_1$, . . . $64_8$ (note $64_1$ . . . $64_8$ activate membrane switches $66_1$ . . . $66_8$). The depression of these pushbuttons $20_1$ . . . $20_8$, $66_1$ . . . $66_8$ activates the presence of a signal on the respective pins PA0 . . . PA16 of the microprocessor 80 (see FIG. 5). The detection of the depression of the pushbuttons ($20_1$ . . . $20_8$, $66_1$ . . . $66_8$) is accomplished by program segment 104.

Program segment 104 monitors the pins PA0 . . . PA16 to determine the activation thereof by the presence of the voltage of battery 86 thereon, and upon such determination, passes control over to the program segment 106.

Program segment 106, via the output terminals PB0, PB1, PB2, PB3 of the microprocessor 80, sets the address corresponding to the depressed pushbutton detected by the program segment 104. This address is directed to the audio storage device 82 or 84 via the inputs A5, A6, A7 and A8 of the audio storage device 82 or 84. Program segment 106, via outputs PA19 and PA18 of microprocessor 80 sets the inputs PD of both the audio storage device 82 or 84 to a low condition, and also sets the input CE of audio storage device 82 or 84 to a low condition, via output terminals PA18 and PA17 of the microprocessor 80, and then passes control over to program segment 108.

Program segment 108 by way of the internal operations of audio storage device 82 or 84 allows the stored sound corresponding to the address selected of each of the inputs A5, A6, A7, A8 to be played through the speaker via the output SPK+ and SPK− of audio storage device 82 and SPK+ of audio storage device 84. After the stored sound is played, program segment 108 passes control over to program segment 110 which represents the end of the sequence of the operational response illustrated in FIG. 7. The microprocessor 80 has the ability to either service or not to service the audio storage device 84 and which may be further described with reference to FIG. 8.

FIG. 8 is a flow chart illustrating the steps taken by the microprocessor 80 of FIG. 5 during a recording scenario by a child to differentiate between the servicing of an inserted cartridge 72, carrying the second audio storage device 84 therewith, or the utilization of a single audio storage device 82 having an internal memory. The microprocessor 80 has its program segment 112 that detects the request for either playing back or recording information on a cartridge. The determination is done by program segment 114.

Program segment 114 detects if a cartridge 72 is inserted by the presence of ground signal on PA21. If the cartridge is not inserted program segment 114 passes control over to program segment 116, or conversely, if the cartridge 72 is inserted program segment 114 passes control over to program segment 118.

Program segment 116 enables internal memory by sensing no ground on PA21 and passing signal to PA18, thereby, enabling audio storage device 82.

Program segment 118 enables the cartridge and disables the internal memory by sensing ground on PA21 and passing signal to PA17, thereby, enabling audio storage device 84.

CHILD'S INTERACTION WITH THE STORYBOOK 10

With reference to FIGS. 2 and 4 for an overall discussion of a first embodiment of the present invention, the electronic storybook 10 provides an interactive dialogue that allows the child to express both his/her artistic and verbal communication skills. With reference to FIG. 2, and assuming for illustrative purposes that the pictorial representations $52_1$, $52_2 \ldots 52_8$, in a manner as previously discussed, respectively illustrates Snow White and the Seven Dwarfs, a child may tell a story by first focussing his/her attention to area $46_1$. The child may render a drawing of Snow White, and contemporaneously therewith, may record his/her feelings concerned with the rendering of Snow White. Before the child's feelings are recorded, the internal memory or the input of the cartridge 72 needs to be inserted into opening 42 so that it becomes interconnected to the circuit arrangement 78 of FIG. 5. Further, for the child to record his/her commentary, he/she should speak into the microphone 22. The child's story telling is recorded by pressing the record button $18_1$ and is played back by pressing the play button $20_1$. The child may continue the story telling of Snow White and the Seven Dwarfs by focussing his/her attention to scene 2 (area $46_2$) and rendering a drawing of the first dwarf, while at the same time manipulating the record pushbutton $18_2$ and the playback pushbutton $20_2$ in a manner similar to that of record pushbutton $18_1$ and playback pushbutton $20_1$ used for Snow White. The child may continue his/her story telling by rendering a drawing for each of the remaining dwarfs, while at the same time manipulating the record pushbutton $18_3 \ldots 18_8$ and the record pushbuttons $20_3 \ldots 20_8$.

A second embodiment that also provides interactive dialogue for the child, but with the assistance or enhancement of prerecorded sounds may be further described with reference to FIGS. 3 and 4. Again, it is assumed that the child wants to describe a story related to "Snow White and the Seven Dwarfs" so that pictorial representations $64_1 \ldots 64_8$ are depicted and mechanized to emit a prerecorded and familiar sound respectively related to Snow White and the Seven Dwarfs. Therefore, while the child is rendering a drawing of Snow White on area $58_1$ (scene 1), a corresponding sound indicative of Snow White may be simultaneously recorded by pressing the record pushbutton $18_1$. The microphone 22 may then be spoken into to allow the child to tell his or her story as it develops for the rendering of Snow White. Simultaneously, the audio storage device 82 serving as a memory device, or audio storage device 84 (being part of the insertable cartridge 72) (see FIG. 5) records the entire story as verbalized by the child. Accordingly, the child may be able to exercise his/her artistic talents by rendering Snow White and the Seven Dwarfs, while at the same time exercising his/her verbal talents by manipulating the record buttons $18_1 \ldots 18_8$ to record his/her commentary of Snow White and the Seven Dwarfs.

Again, with reference to FIGS. 3 and 4 and with regard to a still further embodiment of the present invention, the storybook 10 provides an interactive dialogue by a child pressing the button corresponding to very familiar prerecorded sounds which enhance his/her communication skills. For example, by the child pressing a button corresponding to the sound of a train roaring, he/she may describe a scene in which a train is passing him/her, while he/she stands on a platform. The prerecorded sounds may be used in any manner such that a kitten, a dog or any other sound may be selected and worked into the story that is being rendered by the child in areas $58_1, 58_2 \ldots 58_8$.

It should now be appreciated that the practice of the present invention provides for a storybook allowing for interactive dialogue so that a child may express his/her artistic and verbal communication skills.

It should be further appreciated that the interactive storybook allows the child to supplement his/her story telling skills by interjecting prerecorded sounds.

Further, it should be appreciated that all of the storybooks including its operating controls are provided in a carrying case having a handle to allow for portability and a cover having enclosures to allow for storage slots of the child's goods and drawing instruments.

What we claim is:

1. A storybook particularly suited for a child that allows the child's artistic and verbal participation therewith, said storybook comprising:

(a) a surface on which lines are physically drawn to render one or more scenes;

(b) a plurality of pushbuttons arranged into groups that are segmented into record and play pushbuttons for each scene;

(c) a microphone producing electrical signals in response to a human's voice;

(d) a speaker; and (e) voice recording circuitry with input and output stages and having means for playing back recorded voice, said voice recording circuitry having means at its input stage for receiving said electrical signals from said microphone and means at its output stage for transmitting electrical signals representative of recorded voice to said speaker, said voice recording circuitry having means so as to be activated in response to any of said record and play pushbuttons.

2. The storybook according to claim 1, wherein said voice recording circuitry having means for playing back recorded voice comprises:

(a) a microprocessor connected to said plurality of pushbuttons and generating predetermined controlling routines respectively in response to each of said pushbuttons; and (b) a first audio storage device connected to receive said electrical signals from said microphone and being responsive to each of said predetermined controlling routines and generating corresponding electrical signals representative of recorded voice which are transmitted to said speaker connected thereto.

3. The storybook according to claim 2 further comprising a second audio storage device being arranged to override said first audio storage device.

4. The storybook according to claim 3, wherein said plurality of pushbuttons, microphone, speaker and voice record circuitry having means for playing back recorded voice are all mounted on a case having a first opening and wherein said surface comprises a sheet dimensioned to be insertable into said first opening.

5. The storybook according to claim 4, wherein said case further comprises a second opening and wherein said second audio board is dimensioned to be insertable into said second opening.

6. The storybook according to claim 4, wherein said case further comprises at least one enclosure having an open top and dimensioned to provide space for storage.

7. The storybook according to claim 4, wherein said case has a handle so as to provide a portable case for carrying said storybook.

8. The storybook according to claim 4, wherein said case comprises a plastic material.

9. The storybook according to claim 4, wherein said sheet is paper.

10. The storybook according to claim 4, wherein said sheet is plastic and capable of receiving lines drawn with a water-based ink without being pervious thereto.

11. A story book particularly suited for a child that allows the child's artistic and verbal participation comprising the steps of:

(a) manually drawing lines without the use of electrical means on a surface partitioned into a plurality of scenes;

(b) a plurality of operating means arranged into groups that are segmented into record and play operating means for each scene;

(c) recording verbal commentary contemporaneously with said rendering of said scenes; and (d) playing back said verbal commentary contemporaneously with viewing said rendered scenes.

* * * * *

UNITED STATES PATENT AND TRADEMARK OFFICE
CERTIFICATE OF CORRECTION

PATENT NO. : 5,829,985  
APPLICATION NO. : 08/674170  
DATED : November 3, 1998  
INVENTOR(S) : John V. Campanella

Page 1 of 1

It is certified that error appears in the above-identified patent and that said Letters Patent is hereby corrected as shown below:

Claim 1, line 5 (located at Column 10, line 46), delete the phrase "render one or more" and insert the phrase --render a plurality of--.

Signed and Sealed this

Nineteenth Day of December, 2006

JON W. DUDAS  
*Director of the United States Patent and Trademark Office*